US00RE50728E

(19) United States
(12) Reissued Patent
Figueroa

(10) Patent Number: US RE50,728 E
(45) Date of Reissued Patent: Jan. 6, 2026

(54) CAP OR HAT DECORATION SYSTEM AND METHOD

(71) Applicant: Stahl's Inc., St. Clair Shores, MI (US)

(72) Inventor: Manuel Figueroa, Cooper City, FL (US)

(73) Assignee: Stahls' Inc., St. Clair Shores, MI (US)

(21) Appl. No.: 18/228,075

(22) Filed: Jul. 31, 2023

Related U.S. Patent Documents

Reissue of:
(64) Patent No.: 11,155,116
Issued: Oct. 26, 2021
Appl. No.: 16/177,277
Filed: Oct. 31, 2018

U.S. Applications:
(60) Provisional application No. 62/579,586, filed on Oct. 31, 2017.

(51) Int. Cl.
*B44C 1/17* (2006.01)
*A42B 1/004* (2021.01)
*A42B 1/02* (2006.01)

(52) U.S. Cl.
CPC ..... *B44C 1/1725* (2013.01); *A42B 1/004* (2013.01); *A42B 1/02* (2013.01); *B44C 1/1712* (2013.01); *B44C 1/1729* (2013.01)

(58) Field of Classification Search
CPC ... B44C 1/1712; B44C 1/1729; B44C 1/1725; A42B 1/004; A42B 1/02; A42B 1/248
See application file for complete search history.

(56) References Cited

U.S. PATENT DOCUMENTS 3,567,360 A * 3/1971 Stiff ..... C08B 11/15 536/44
4,266,476 A * 5/1981 Maloof ..... B41F 15/0895 101/115
5,769,999 A * 6/1998 Anderson ..... B29C 66/91421 100/319
6,209,605 B1 4/2001 Lee et al.
2009/0188404 A1* 7/2009 Styles ..... B41F 17/38 101/483

(Continued)

FOREIGN PATENT DOCUMENTS

JP 2006070380 A * 3/2006
KR 10-1602401 B1 3/2016
WO 2014/130599 A2 8/2014

OTHER PUBLICATIONS

International Search Report and Written Opinion for International Application No. PCT/US2018/058570, dated Mar. 26, 2019, 11 pages.

*Primary Examiner* — Christina Y. Leung
(74) *Attorney, Agent, or Firm* — Bodman PLC

(57) ABSTRACT

Embodiments include a cap or hat decoration method by providing a press including a lower platen and upper platen, and coupling a pad to the lower platen, where the pad is dimensioned based on one or more dimensions of the cap or hat, and positioning the cap or hat onto at least a portion of the pad. Further, the method includes positioning at least one decoration onto at least a portion of the cap or hat, where the at least one decoration includes a heat-activated adhesive, and heating and compressing the decoration onto the cap or hat by compressing the cap or hat and decoration between the lower platen and upper platen.

19 Claims, 12 Drawing Sheets

(56) References Cited

U.S. PATENT DOCUMENTS

| | | | | |
|---|---|---|---|---|
| 2010/0084083 | A1 | 4/2010 | Hull | |
| 2010/0326591 | A1* | 12/2010 | Langvin | A43B 23/24 156/230 |
| 2016/0229223 | A1 | 8/2016 | Kajitani | |

* cited by examiner

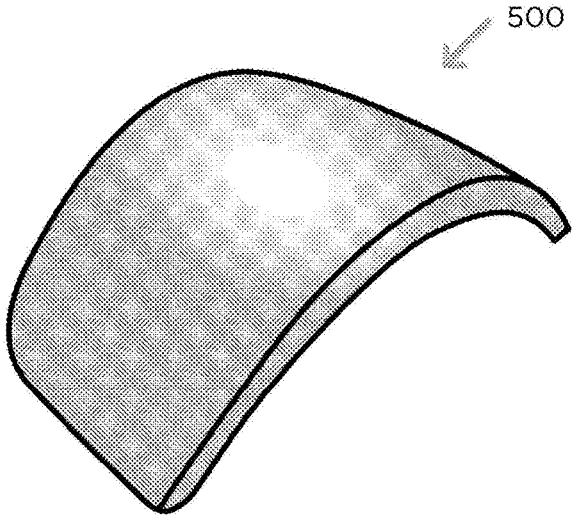
FIG. 5E
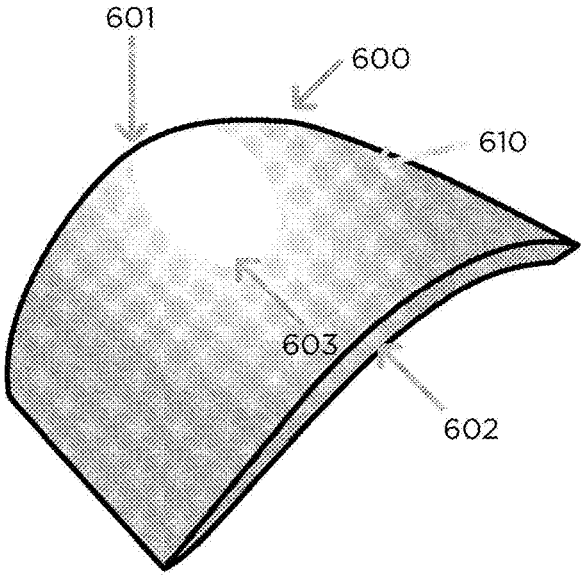
FIG. 6A
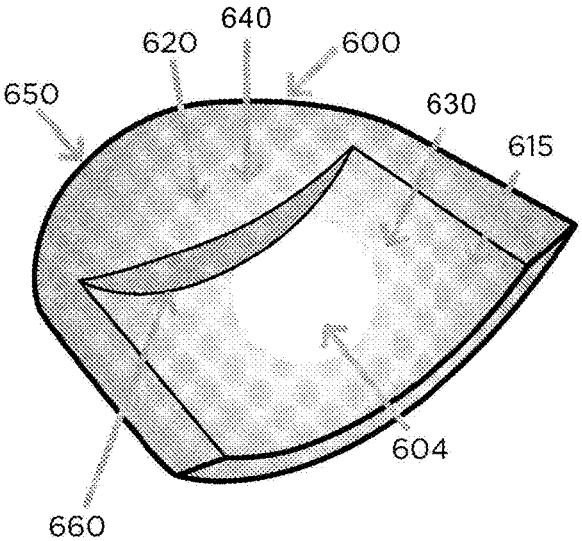
AMENDED FIG. 6B

AMENDED FIG. 8A

CAP OR HAT DECORATION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a Reissue Application of U.S. patent application Ser. No. 16/177,277 filed Oct. 31, 2018, and issued as U.S. Pat. No. 11,155,166 on Oct. 26, 2021, which* claims priority to U.S. provisional application Ser. No. 62/579,586 filed on Oct. 31, 2017, the entire contents of which are incorporated herein by reference.

BACKGROUND

Caps or hats are often decorated with one or more emblems (for example, a team emblem or mascot, or other insignia). To reduce manufacturing costs, and to provide flexibility to the consumer, the emblems are usually applied to a plain or generic cap or hat rather than being sown directly into the structure of the cap or hat during fabrication. Generic caps or hats can be produced in larger volumes at lower costs, and can be shipped to distributors or vendors where emblems can be applied based on market demand.

The post-manufacture decoration of caps or hats typically utilizes heat seal products that are applied to the surface of the cap or hat using a heat press machine. However due to the uneven shape of many cap or hat designs, the heat press can produce residual marks or indentations when applying the decoration under compression, and the final product is often rejected by the consumer. Thus, there is a need to provide an improved molding process that enhances final product quality, and retains the cost and flexible design advantages provide by post-manufacture decoration.

SUMMARY OF THE INVENTION

A cap or hat decoration method comprising providing a press including a lower platen and upper platen, and coupling a pad to the lower platen, where the pad is dimensioned based on one or more dimensions of the cap or hat. Some embodiments include positioning the cap or hat onto at least a portion of the pad, and positioning at least one decoration onto at least a portion of the cap or hat, the at least one decoration including a heat-activated adhesive. Some embodiments include heating and compressing the decoration onto the cap or hat by compressing the cap or hat and decoration between the lower platen and upper platen.

In some embodiments, the pad comprises a flexible or compressible polymer. In some embodiments, the pad comprises a silicone polymer. In some embodiments of the invention, the cap or hat comprises at least one concave inner surface and at least one convex outer surface. In some embodiments, the method of compressing of the decoration onto the cap or hat comprises a compression time of between about 10 seconds and 45 seconds. In some embodiments, the lower platen and/or the upper platen are heated to a temperature that enables the decoration to reach a temperature of between 230° F. and 360° F., and/or between 380° F. and 430° F., and/or between 340° F. and 365° F.

In some embodiments, the compressing of the decoration onto the cap or hat uses a compression force of between 20 lbs., and 80 lbs. In some embodiments, the pad includes an inner edge positioned between a first and second portion of the pad. In some embodiments, the pad includes an extension extending from one end of the pad, the extension configured and arranged to position a sweat band of the cap or hat. In some embodiments, the lower platen is convex, and the upper platen is concave. In some embodiments, the decoration comprises a label, decal, insignia, mark, and/or marker.

Some embodiments include a good processing method comprising determining one or more dimensions of a good, preparing a mold model using the one or more good dimensions, and preparing a mold based on the mold model. Some embodiments include preparing at least a first pad using the mold, where the first pad is dimensioned based on one or more dimensions of the good transferred by the mold. Some embodiments include providing a press including a lower platen and upper platen, and positioning at least the first pad over the lower or upper platen. Some embodiments include positioning the good onto at least a portion of the first pad, and positioning at least one decoration onto at least a portion of the good, where the at least one decoration includes a heat-activated adhesive. Some embodiments include heating and compressing the decoration onto the good by compressing the good and decoration between the lower platen and upper platen, wherein at least one of the lower or upper platen is heated.

Some embodiments of the method include forming at least a second pad using the mold, where the second pad is dimensioned based on one or more dimensions of the good transferred by the mold, and positioning the second pad over the lower or upper platen. In some embodiments of this method, the lower platen is convex, and the upper platen is concave, and the pad comprises at least one concave inner surface and at least one convex outer surface. In some further embodiments of the method, the pad comprises a flexible or compressible polymer.

In some embodiments, the pad includes an inner edge positioned between a first and second portion of the pad, and further includes an extension extending from one end of the pad, the extension configured and arranged to position a sweat band of the good. In some embodiments of this method, at least one of the lower platen and upper platen are heated to a temperature of a range selected from ranges 230° F. to 360° F., and 380° F. to 430° F., and 340° F. to 365° F. In some other embodiments of this method, the compressing of the decoration onto the good comprises a compression time of between about 10 seconds and 45 seconds.

DESCRIPTION OF THE DRAWINGS

FIG. 5E shows a hat mold produced from the design of FIGS. 5A-5D in accordance with some embodiments of the invention.

FIGS. 6A-6B shows outer and inner views of a pad from the hat mold of FIG. 5E in accordance with some embodiments of the invention.

FIGS. 8A-8C shows a hat positioned on a pad as shown in FIGS. 7A-7C in accordance with some embodiments of the invention.

DETAILED DESCRIPTION

Figure 1:
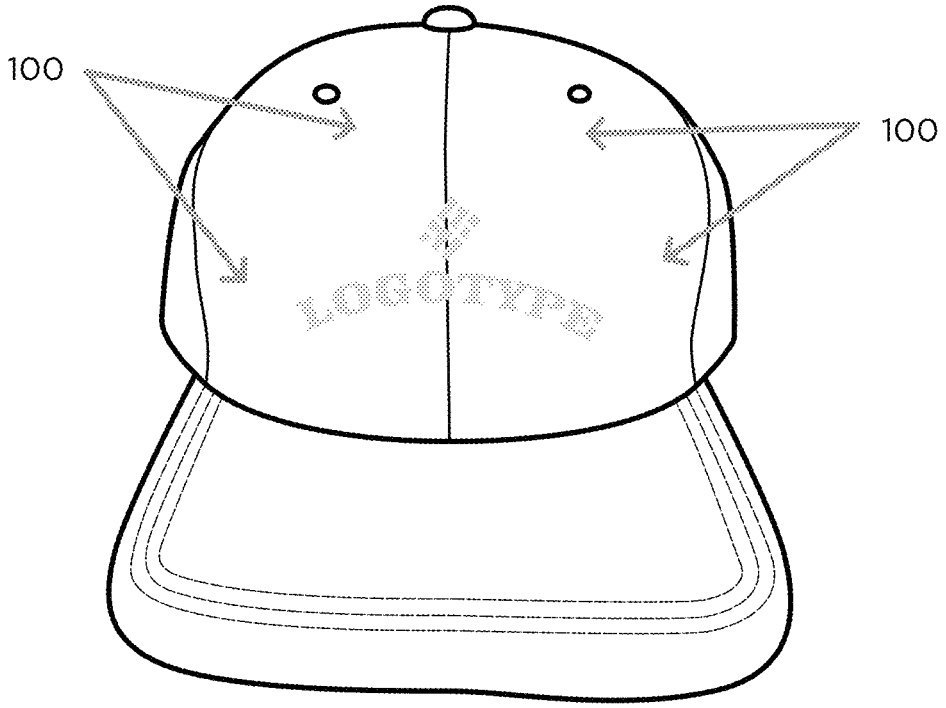
FIG. 1 is a perspective view of a cap with an applied emblem.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include a hat mold preparation process or method. Some include a hat decoration method that uses one or more conformation pads that are produced and based upon the hat molds produced by the hat mold preparation process. In some embodiments, the decoration can be a label, decal, insignia, and any added mark or marker.

Some embodiments include the decoration of hats or caps (hereinafter referred to as "hats") using one or more heat seal products. In some embodiments, the heat seal products are applied using heat press machines using specific pressures or ranges of pressures, specific temperatures or ranges or temperatures, and specific process times or ranges of process times.

Some embodiments of the invention can utilize a conventional heat press that can include a bottom and/or top platen. In some embodiments, the bottom platen of the heat press can be selected with a specific size to fit different sizes of hats. Some of these platens are interchangeable. In some embodiments, the heat platen can be the lower platen, the upper platen, or both platens can be heated platens. In some embodiments, the time, pressure and temperature can be varied depending on the product to be applied and/or the type of hat or cap. For example, if the product is thick as embroidery emblems, then more time will be required. If the glue used in the product is industrial level, then more heat will be needed.

In some embodiments of the invention, including any of the methods described herein, an emblem heat seal glue can be activated from about 230° F. to about 360° F., or lower temperature. Some embodiments can utilize an industrial grade heat seal glue activated at a higher temperature (e.g., from about 380° F. to about 430° F., and may be higher). In some embodiments, "low melt" temperatures of about 340° F. to about 365° F. can be used for the platen temperature. In some embodiments of the invention, the application time can be 10 seconds to 45 seconds (depending on the thickness of the product). In some embodiments of the invention, the platen pressure can be between 20 lbs., and 60 lbs. In some other embodiments of the invention, the platen pressure can be between 20 lbs., and 80 lbs.

Some other embodiments can use a temperature of between about 380° F. and about 425° F., with a process time of 10 seconds to 45 seconds (depending on the thickness of the product), and pressures of between 20 lbs., and 60 lbs, or between 20 lbs., and 80 lbs. In some embodiments, these temperatures can be reached with a top heated press only. Other embodiments can use bottom heated platens.

In some embodiments, one or more conformable pads can be used in an assembly of a heat press to aid in the decoration process. In some embodiments, one or more conformable pads can be placed on one or both platens during pressing of a decoration into a surface of a hat. In some embodiments, heat can be applied to the lower platen, the upper platen, or to both the upper and lower platens. In some embodiments, the upper and/or the lower platen can be curved. For example, in some embodiments, the lower platen can be convex and the upper platen can be concave. In other embodiments, the lower platen can be concave and the upper platen can be convex.

Figure 2:
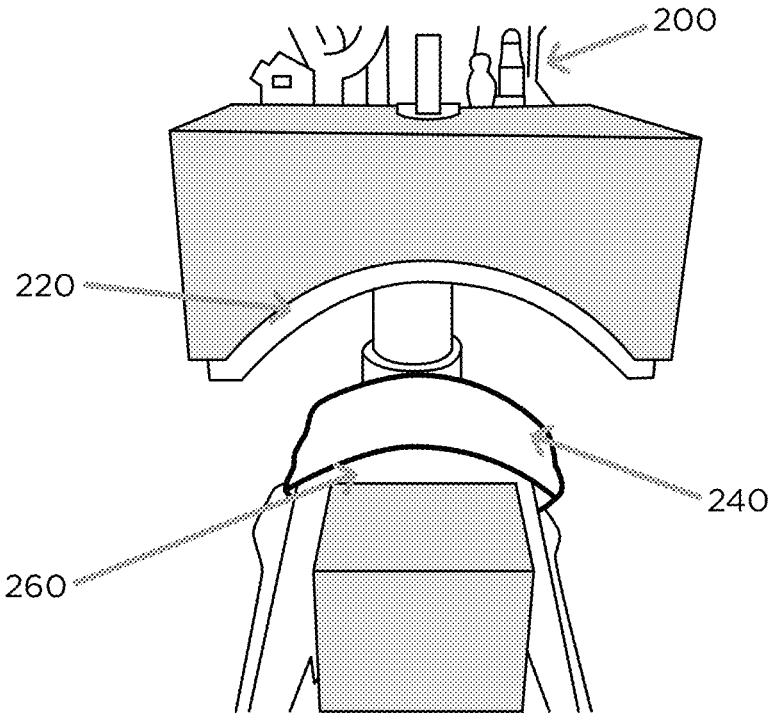
FIG. 2 shows a conventional heat press used for applying emblems to hat surfaces.

As depicted in FIG. 1, showing a perspective view of a cap with an applied emblem, in some embodiments, when applying the decoration in conventional processes, the heat press can leave marks (indentations 100) of the platens on one or more portions of the hat. In this instance, the shape of the heat press platens is curved but they match only the curve of the front of the hat, causing the marks in the edges where the hats have no support at all (see for example FIG. 2 showing a heat press 200 used for applying emblems to hat surfaces).

Figure 3A:
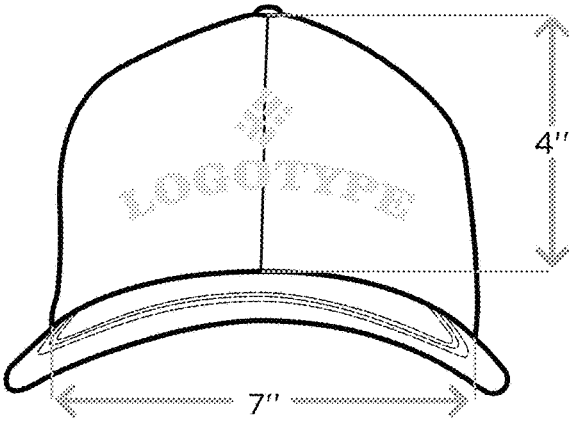
FIG. 3A shows a front view of a cap with cap measurements used to prepare molds for the preparation of conformation pads in accordance with some embodiments of the invention.
Figure 3B:
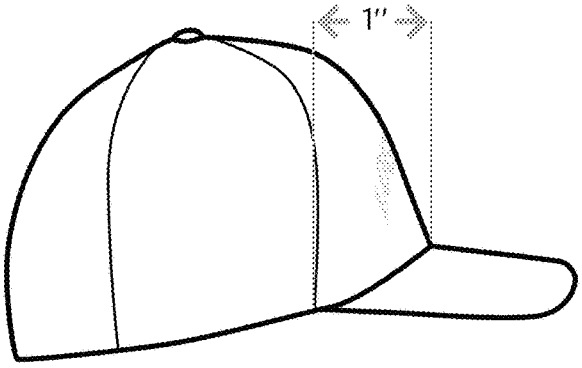
FIG. 3B shows a side view of a cap with cap measurements used to prepare molds for the preparation of conformation pads in accordance with some embodiments of the invention.
Figure 3C:
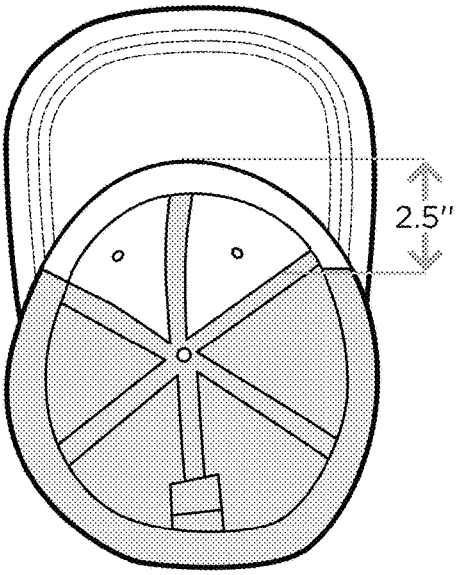
FIG. 3C shows a bottom view of a cap with cap measurements used to prepare molds for the preparation of conformation pads in accordance with some embodiments of the invention.
Figure 4A:
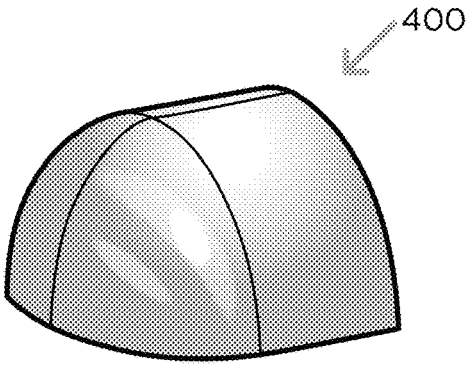
FIGS. 4A-4F show various perspective views of a hat mold design in accordance with some embodiments of the invention.
Figure 4B:
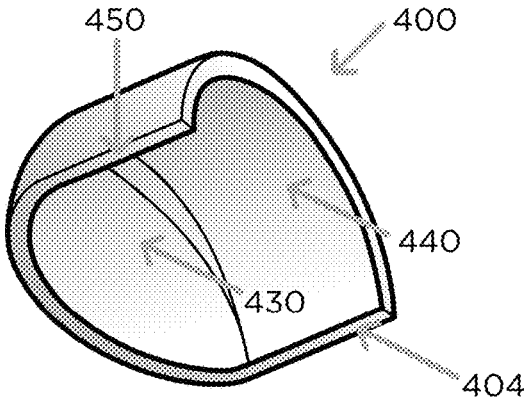
Figure 4C:
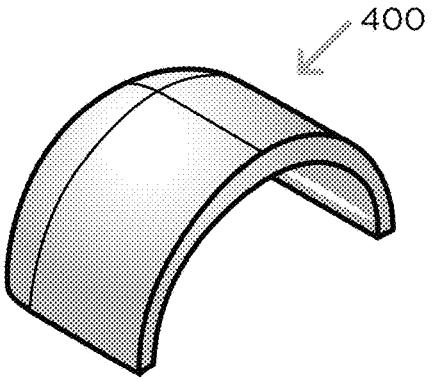
Figure 4D:
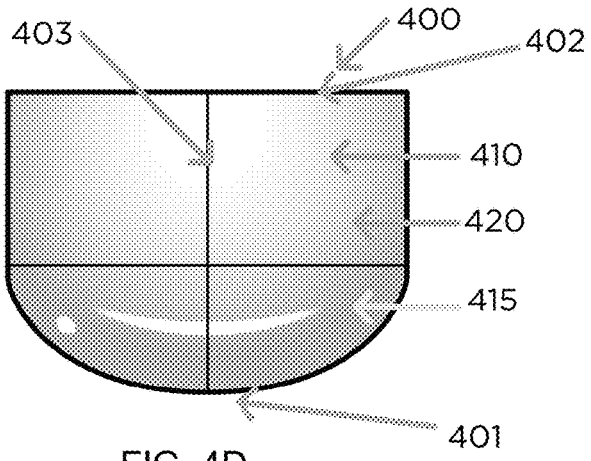
Figure 4E:
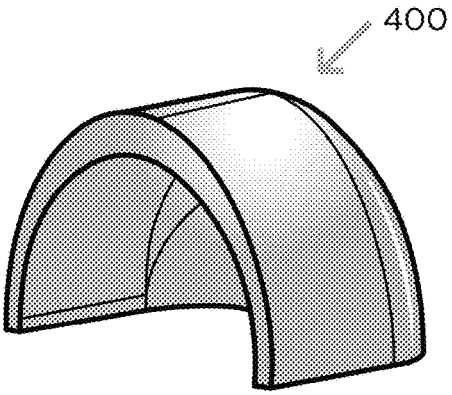
Figure 4F:
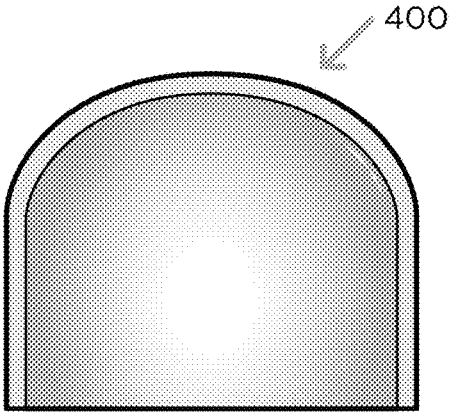

In some embodiments of the invention, a conformable pad comprising a shape of the inner part of the hat and matched with the curve of the platens of the heat press can be used to decorate the hat without inducing unwanted creases, marks, or other imperfections. For example, some embodiments include a pad 240 that can be placed on lower platen 260 below the top platen 220 of the press 200. In the non-limiting embodiment, the lower platen 260 is convex. In some embodiments, the specific dimensions of a mold used to create the conformable pad 240 can be obtained from measurements of the hat (depicted in FIGS. 3A-3C, where the width, height and inner dimensions can be used). In this non-limiting example embodiment, the width can be seven inches, the height can be four inches, the center-line to edge of the shade can be one inch, and the frontal region can be 2.5 inches. However, the sizes can vary beyond those shown, and can be determined by the product. In other words, some dimensions can be smaller than those shown, whereas others can be larger than those shown.

In some embodiments, these measurements can be used to prepare 3D models of molds for the conformable pad. For example, FIGS. 4A-4F show various perspective views of a hat mold design in accordance with some embodiments of the invention, and FIGS. 5A-5D show views of a hat mold design in accordance with some embodiments of the invention. In some further embodiments, the mold dimensions can be obtained from the specifications of the hat. In some embodiments, measurements of the hat can be made by hand. In some other embodiments, the dimensions can be obtained using laser scanning dimension analysis of the hat. In this non-limiting embodiment, the mold 400 can comprise a body 410 extending between a first end 401 and a second end 402, a top end 403, and a bottom end 404. In some embodiments, the body 410 can comprise a first portion 415 extending from the first end 401 towards the second end 402. In some embodiments, the first portion 415 can be coupled to or integrated with a second portion 420 that extends from the second end 402 towards the first end 401. In some embodiments, the first portion 415 can comprise a concave inner surface 430, and the second portion 420 can comprise a concave inner surface 440, and the outer surfaces of the first and second portions 415, 420 can be convex or curved.

In some further embodiments, the second portion 420 can comprise an inner edge 450. In some embodiments, the inner edge 450 can be positioned at an interface between the first and second portions 410, 415. In some embodiments, the inner edge 450 can extend between two sides of the mold 400. In some embodiments, the diameter of the inner edge 450 can vary from one side of the mold 400 to the other. In some embodiments, the inner edge 450 can comprise a diameter that is greater at the center of the mold 400, while reducing in diameter towards the edges. In some embodiments, the reduction in diameter is equal on both sides of the mold 400 so that the mold 400 comprises a symmetrical shape about the center. In some embodiments, at least a portion of the diameter of the first portion 415 can vary from one side of the mold 400 to the other. In some embodiments, the first portion 415 can comprise a thickness that is greater at the center of the mold 400, while reducing in diameter towards the edges. In some embodiments, the reduction in diameter is equal on both sides of the mold 400 so that the mold 400 comprises a symmetrical shape about the center. In some further embodiments, at least a portion of the diameter of the second portion 420 can vary from one side of the mold 400 to the other. In some embodiments, the second portion 420 can comprise a diameter that is greater at the center of the mold 400, while reducing in diameter towards the edges. In some embodiments, the reduction in diameter is equal on both sides of the mold 400 so that the mold 400 comprises a symmetrical shape about the center.

Figure 5A:
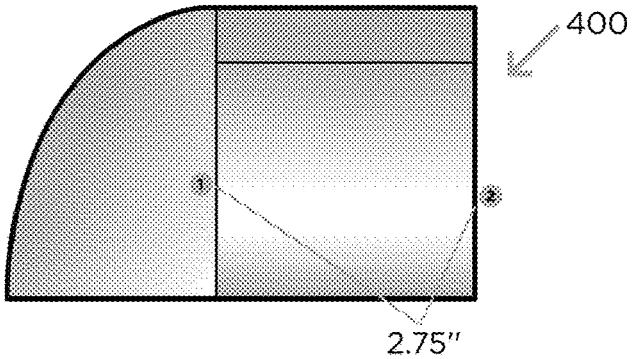
FIGS. 5A-5D show views of a hat mold design in accordance with some embodiments of the invention.
Figure 5B:
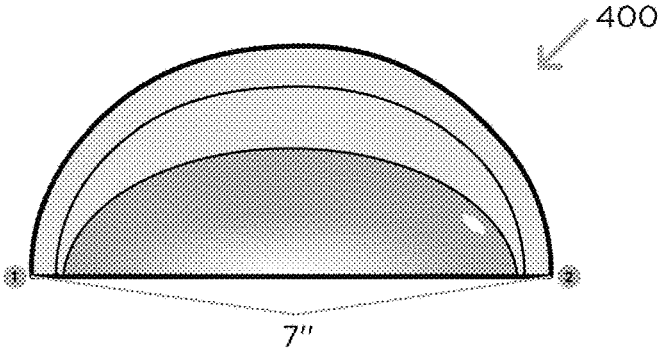
Figure 5C:
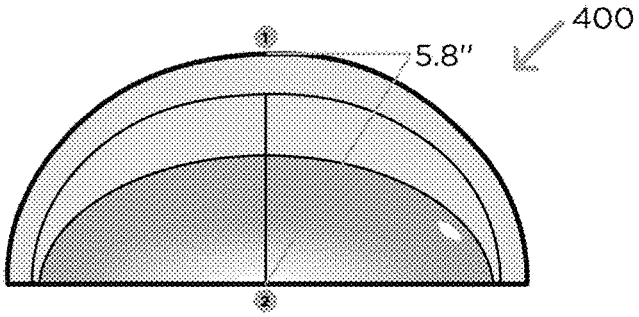
Figure 5D:
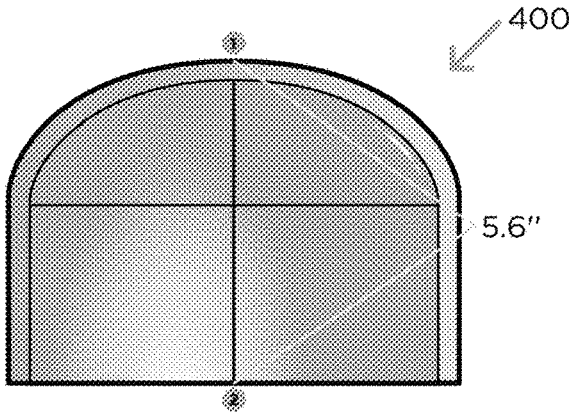

In some embodiments of the invention, using the measurements, a mold can be created using fiber glass resin or other conventional molding material (such as any moldable polymer or polymer composite material, or any mold material such as plaster). For example, FIG. 5E shows a hat mold 500 produced from the design shown in FIGS. 4A-4F, 5A-5D. In some embodiments, at least a portion of the mold 500 can be designed and fabricated using 3D software and a 3D printer. In some embodiments of the invention, using the prototype mold such as the mold 500 of FIG. 5E, a conformable pad can be molded and replicated. For example, FIGS. 6A-6B shows a pad 600 produced from the hat mold 500 of FIG. 5E in accordance with some embodiments of the invention. In this non-limiting embodiment, the pad 600 can comprise a body 610 extending between a first end 601 and a second end 602, a top end 603, and a bottom end 604. In some embodiments, the body 610 can comprise a first portion 615 extending from the first end 601 towards the second end 602. In some embodiments, the first portion 615 can be coupled to or integrated with a second portion 620 that extends from the second end 602 towards the first end 601. In some embodiments, the first portion 615 can comprise a concave inner surface 630, and the second portion 620 can comprise a concave inner surface 640, and the outer surfaces of the first and second portions 615, 620 can be convex or curved. In some further embodiments, the second portion 620 can comprise an inner edge 650. In some embodiments, the inner edge 650 can be positioned at an interface between the first and second portions 610, 615. In some embodiments, the inner edge 650 can extend between two sides of the pad 600. In some embodiments, the diameter of the inner edge 650 can vary from one side of the pad 600 to the other. In some embodiments, the inner edge 650 can comprise a diameter that is greater at the center of the pad 600, while reducing in diameter towards the edges. In some embodiments, the reduction in diameter is equal on both sides of the pad 600 so that the pad 600 comprises a symmetrical shape about the center. In some embodiments, at least a portion of the diameter of the first portion 615 can vary from one side of the pad 600 to the other. In some embodiments, the first portion 615 can comprise a thickness that is greater at the center of the pad 600, while reducing in diameter towards the edges. In some embodiments, the reduction in diameter is equal on both sides of the pad 600 so that the pad 600 comprises a symmetrical shape about the center. In some further embodiments, at least a portion of the diameter of the second portion 620 can vary from one side of the pad 600 to the other. In some embodiments, the second portion 620 can comprise a diameter that is greater at the center of the pad 600, while reducing in diameter towards the edges. In some embodiments, the reduction in diameter is equal on both sides of the pad 600 so that the pad 600 comprises a symmetrical shape about the center.

In some embodiments, the pad 600 can comprise rubber, silicone, or other flexible polymer. In some embodiments, the polymer used can have different durometers to adapt its shape and properties for use with almost any hat. Further, in some embodiments, the polymer used can be heat resistant, and can be used multiple times without any deformation. In some embodiments, the polymer can be a durometer of 35 A. Other durometers can be 60 A; 50 A; 45 A, and 25 A.

Figure 7A:
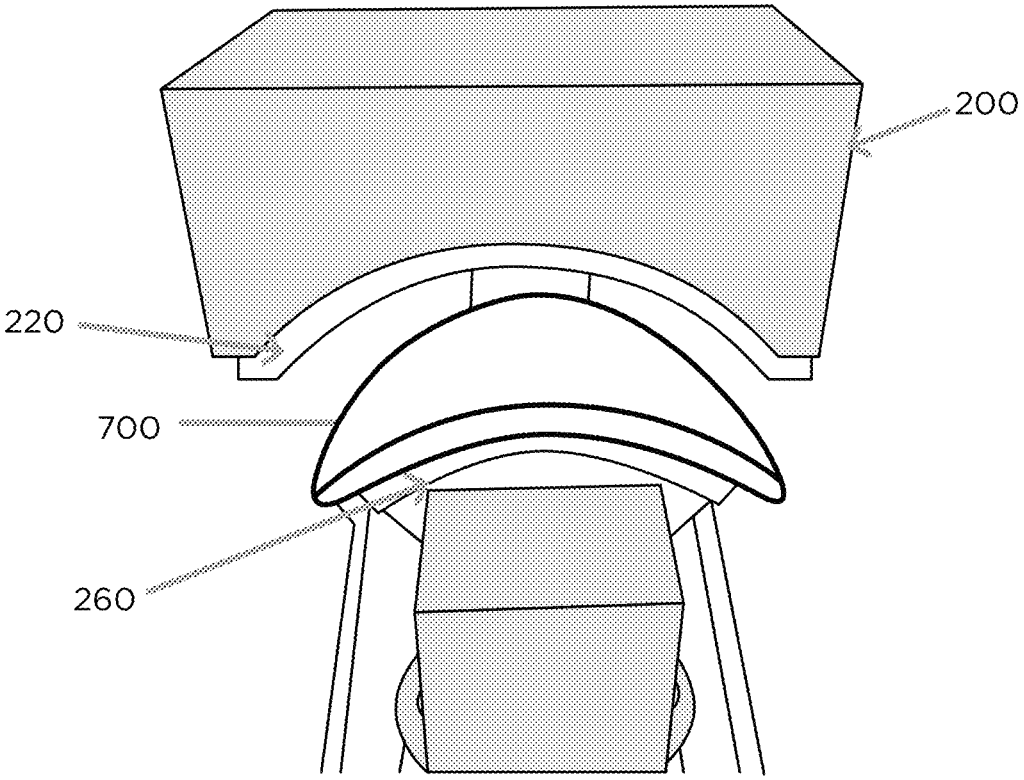
FIGS. 7A-7B shows a pad positioned on a lower platen of a hat heat press machine in accordance with some embodiments of the invention.
Figure 7B:
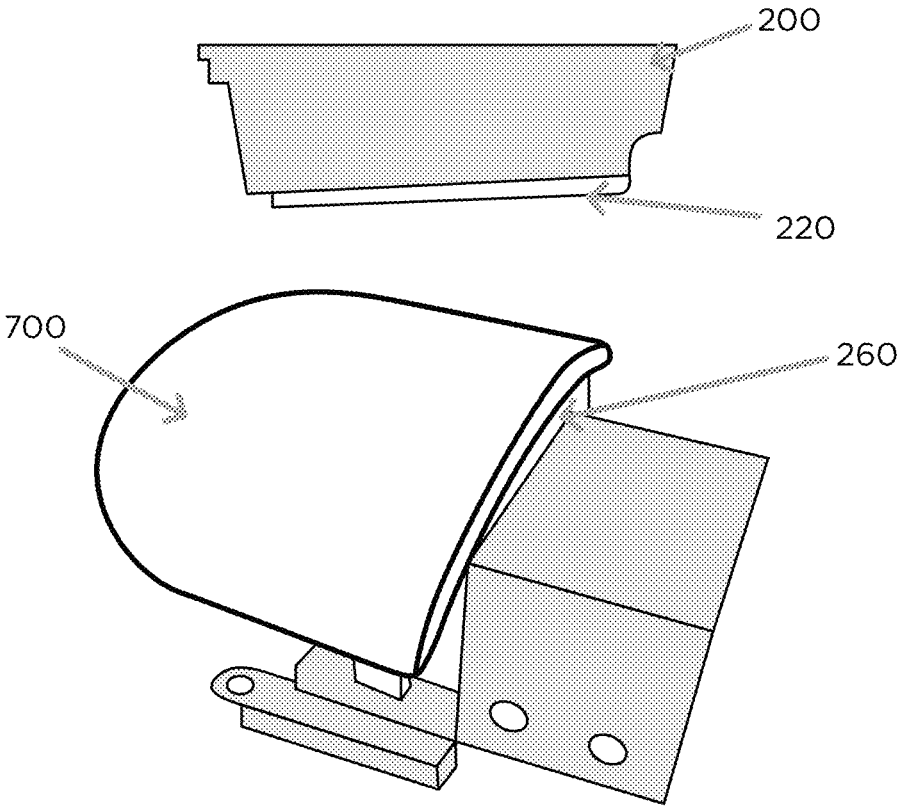

In some embodiments of the invention, the conformable pad 600 can be shaped rubber silicone that can fit in a hat heat press machine and be used as a decoration tool for hats. In some embodiments, the pad 600 can be positioned inside the hat to provide support and avoid hat damage when applying a decoration using a heat press. For example, FIGS. 7A-7B show a pad 700 positioned on a lower platen of a hat heat press machine in accordance with some embodiments of the invention. FIG. 7 shows a pad 700 (which can comprise pad 600) positioned on a lower platen 260 of a hat heat press machine 200. In some embodiments, the inner or concave side of the pad 700 (i.e., equivalent to inner surface 630) can be positioned against the upper surface of the lower platen 260, and the outer or convex surface of the pad 700 can be positioned to accept an inner surface of a hat.

In some embodiments, as seen at least in FIGS. 6A-6B and during use, the pad 600 can be placed, i.e., coupled, on a platen (e.g., such as a lower platen 260) so that the inner surface 630 of the first portion 615, namely an internal wall 660 formed on an inner surface thereon (that opposes the outer surface of the pad) and extending from the bottom end 604 or inner surface 630 of the pad 600 towards the top end 603 or outer surface of the pad 600, can be placed against an edge of the lower platen 260, and the second portion 620 can extend beyond the lower platen 260, extending below the edge of the lower platen 260. This can allow portions of a mounted or coupled cap or hat to extend away from the lower platen 260.

Figure 8B:
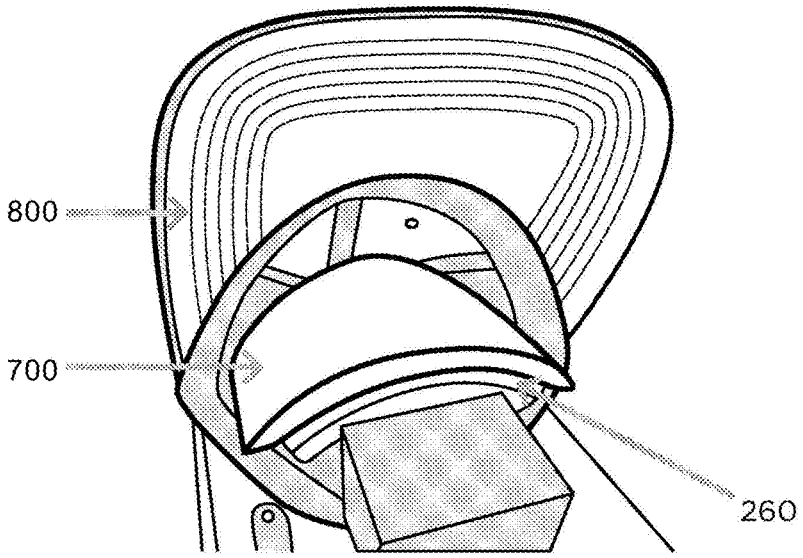
Figure 8B:
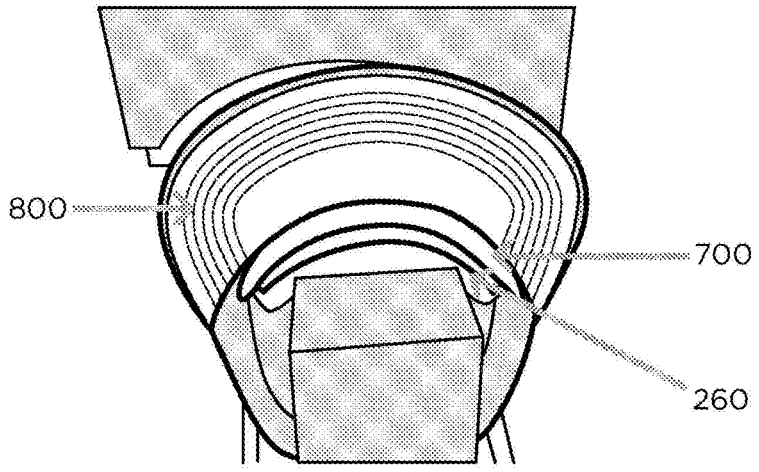
Figure 8C:
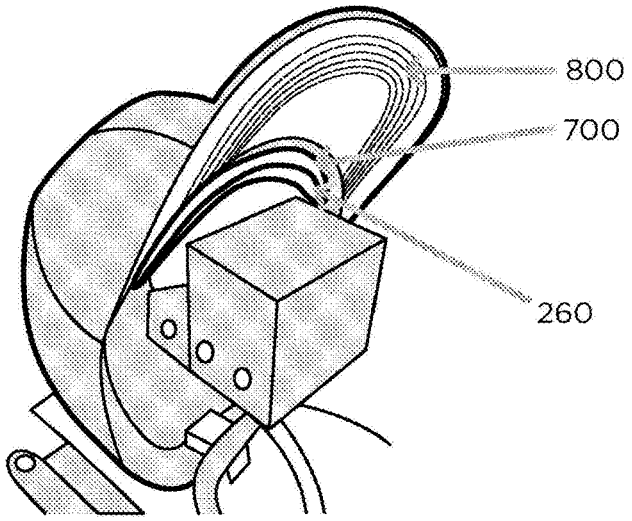

FIGS. 8A-8C shows a hat positioned on a pad as shown in FIGS. 7A-7C in accordance with some embodiments of the invention. This non-limited embodiment shows how the hat 800 fits on the silicone pad 700 positioned or coupled in the heat press (shown with platen 260). In some embodiments, the pad 700 can be positioned onto the lower platen 260 of heat press, and a plain hat (hat 700) can be positioned over the pad 700. One or more attachable or transferrable decorations can then be positioned on the outside of the hat 700 and/or on the inner surface of the upper platen (not shown in FIGS. 8A-8B). In some further embodiments, a second pad can be placed over the upper surface of the hat over one or more decorations and between the upper platen and the hat. In this instance, the second pad can comprise a specific shape to prevent the introduction of any artifacts from any portions of the upper platen.

Figure 9A:
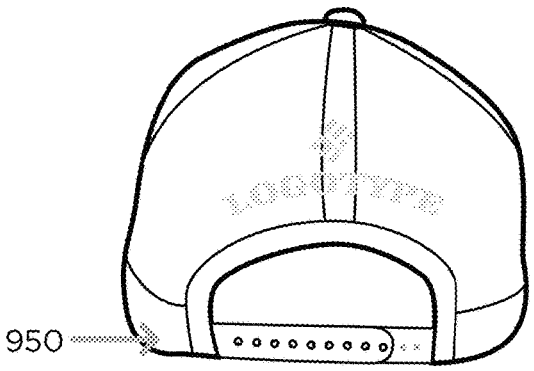
FIGS. 9A-9B illustrates a cap with applied emblems in accordance with some embodiments of the invention.
Figure 9B:
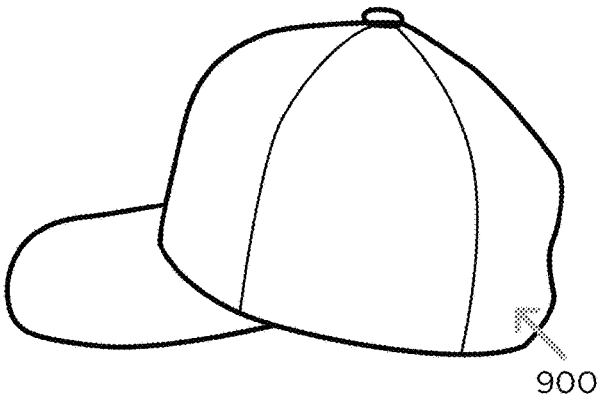
Figure 10A:
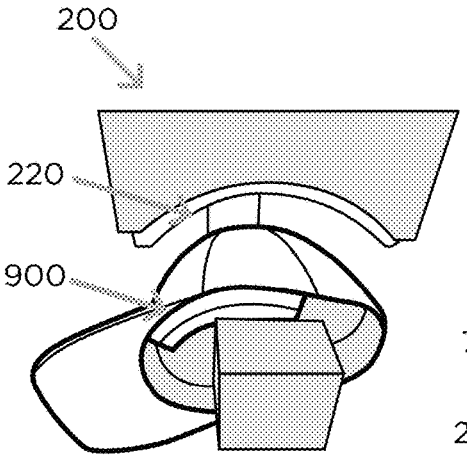
FIGS. 10A-10B show side and front emblem application in accordance with some embodiments of the invention.
Figure 10B:
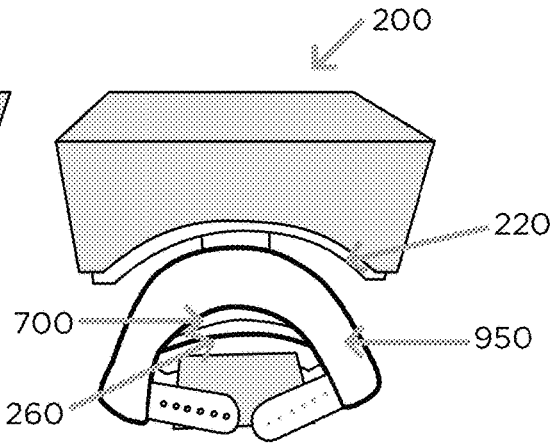

In some embodiments, the systems and methods described herein can be used to apply emblems to other regions of a hat or cap. For example, FIGS. 9A-9B illustrate a cap 900, with applied emblems in accordance with some embodiments of the invention. In some embodiments, emblems can be applied to the rear and/or side of a hat or cap 900. For example, FIGS. 10A-10B shows front (FIG. 10B) and side (FIG. 10A) emblem application in accordance with some embodiments of the invention. As depicted, during the application, the same pad 700 can be used and the position of the hat 700 can be changed. Other embodiments can include intermediate positions between the front, side, and/or rear of the cap or hat 900 where the cap or hat 900 can be incrementally positioned based on a desired location of the emblem or emblems.

Figure 11:
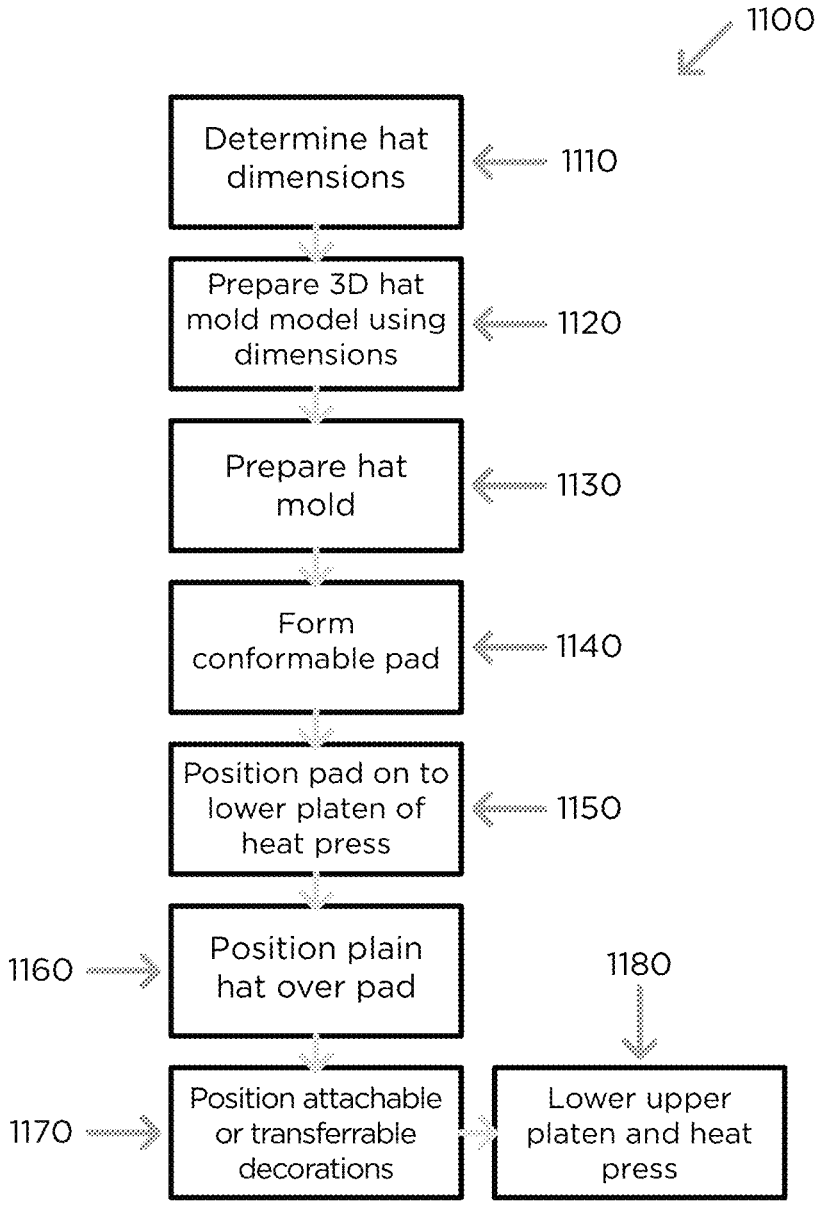
FIG. 11 shows a process for preparing a pad and using the pad to decorate a hat in accordance with some embodiments of the invention.

In some embodiments, other conformable pads can be placed at other locations between the platens to prevent the introduction of any artifacts from any portions of the platens and to provide additional support to the hat as desired. In some embodiments, the upper platen 220 can then be lowered and the press heated and/or pressure applied. In some embodiments, the upper platen 220 is concave. The preparation of the hat mold, the preparation of the conformation pad, and the use of a pad in preparing a decorated hat is summarized in FIG. 11 showing the process 1100. For example, step 1110 can comprise determining hat dimensions. Further, in some embodiments, step 1120 can comprise preparing a three-dimensional hat mold. Further, in some embodiments, step 1130 can comprise preparing a hat mold. Further, in some embodiments, step 1140 can comprise forming a pad. Further, in some embodiments, step 1150 can comprise positioning pad onto lower platen. Further, in some embodiments, step 1160 can comprise positioning hat over pad. Further, in some embodiments, step 1170 can comprise positioning attachable or transferrable decorations. Further, in some embodiments, step 1180 can comprise lowering the upper platen and heat press.

Figure 12A:
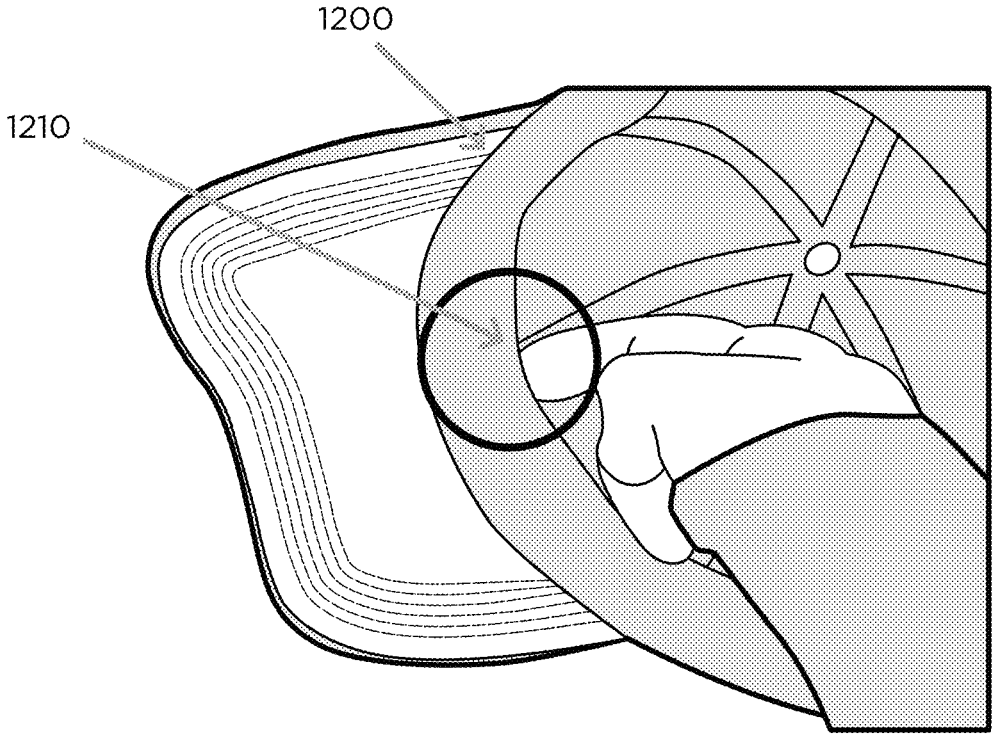
FIG. 12A shows an inner view of a cap in accordance with some embodiments of the invention.
Figure 12B:
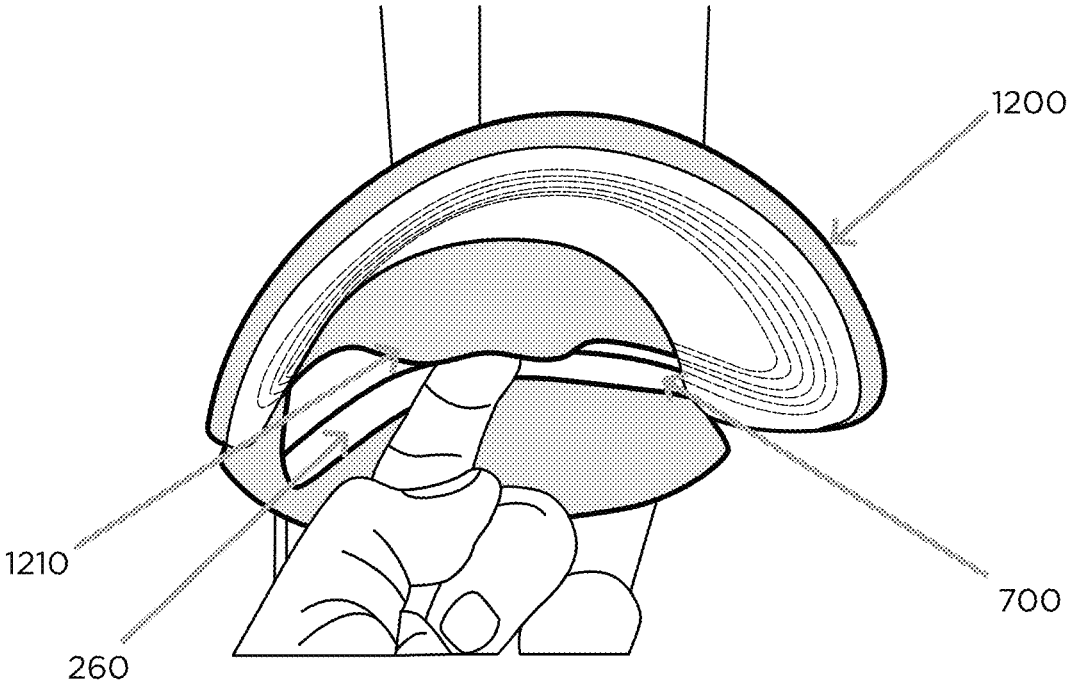
FIG. 12B shows an inner view of a cap positioned on a platen in accordance with some embodiments of the invention.
Figure 12C:
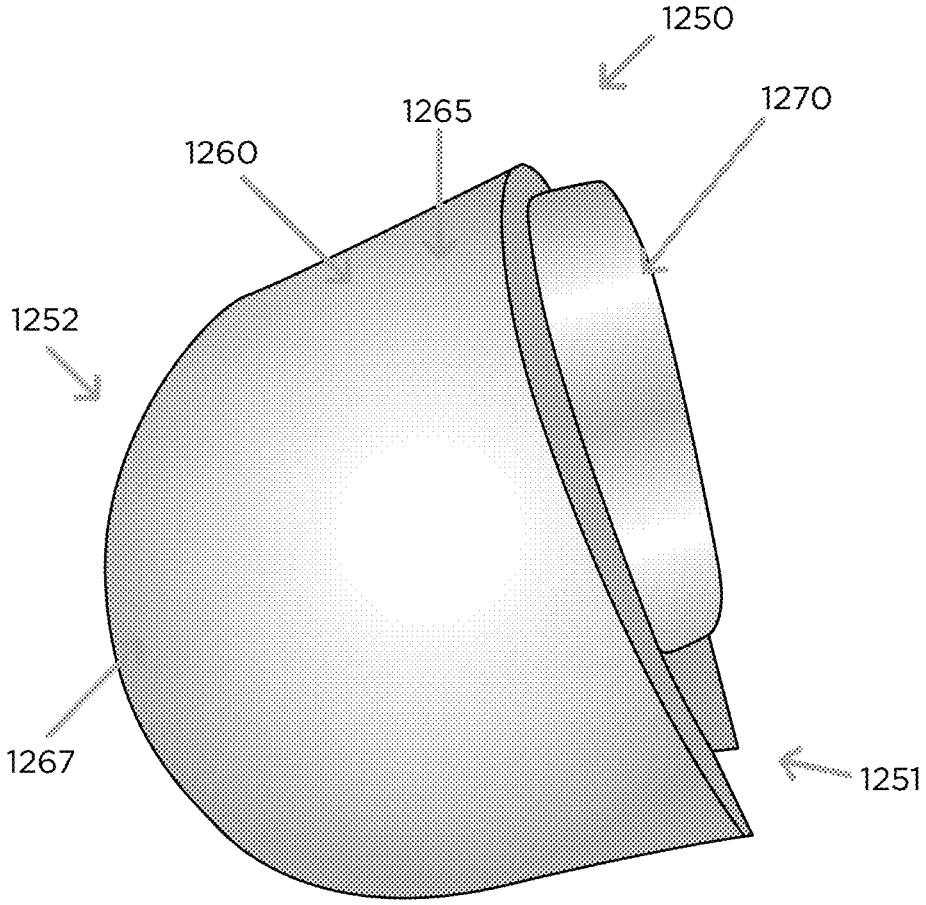
FIG. 12C shows a mold insert in accordance with some further embodiments of the invention.

As shown earlier at least in FIG. 3C, and further in FIG. 12A showing an inner view of a cap 1200, some caps or hats include a sweat band (shown as band 1210 in FIG. 12A). FIG. 12B shows an inner view of a cap 1200 positioned on a platen in accordance with some embodiments of the invention. In some embodiments, manual separation of the band 1210 can cause injury. Thus, in some embodiments, the band 1210 can be held forward (towards the cap bill) using an extension of the pad, such as a metal strip or other material extension. In some embodiments, the operator can use this extension to move aside the sweat band, for example, by attaching the sweat band 1210 into the extension while placing the hat in to the heat press. For example, FIG. 12C shows a mold insert 1250 in accordance with some further embodiments of the invention.

Figure 13A:
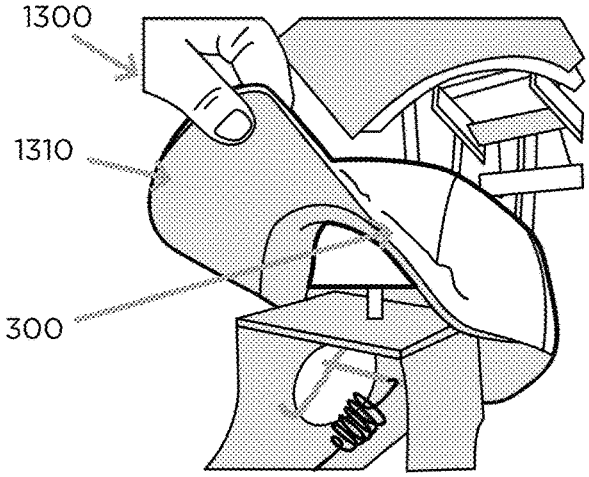
FIG. 13A shows a cap positioned on a platen in accordance with some embodiments of the invention.
Figure 13B:
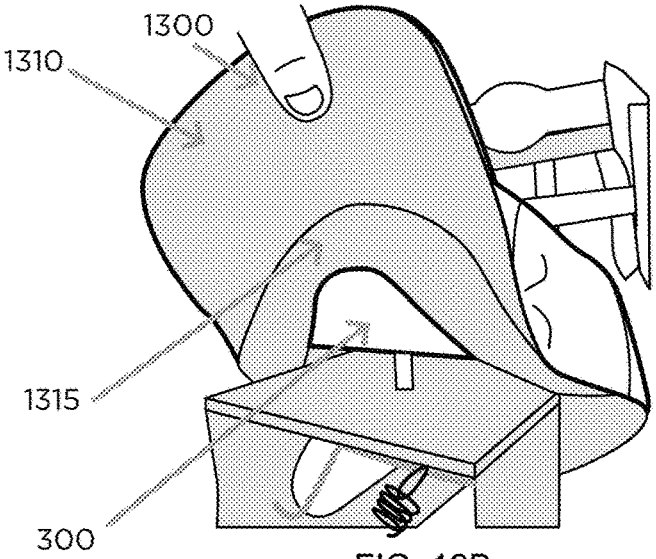
FIG. 13B shows a close-up view of a cap positioned on a platen in accordance with some embodiments of the invention.
Figure 13C:
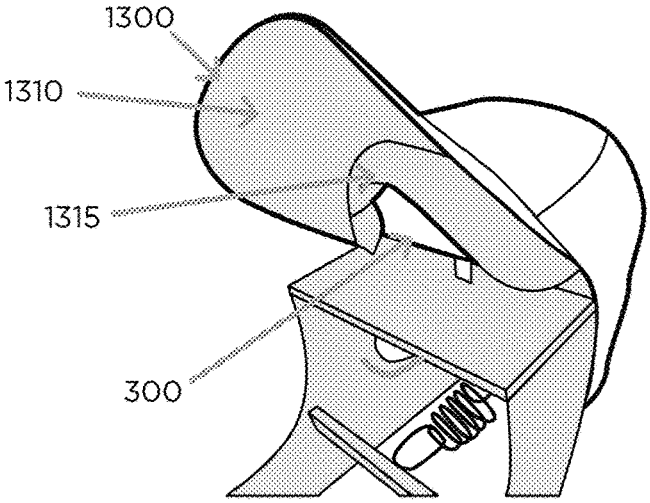
FIG. 13C shows a close-up of a cap positioned on a platen with sweat-band forward in accordance with some embodiments of the invention.

In this non-limiting embodiment, the mold insert 1250 can comprise a body 1260 extending between a first end 1251 and a second end 1252. In some embodiments, the body 1260 can comprise a first portion 1265 extending from the first end 125 towards the second end 1252. In some embodiments, the first portion 1251 can be coupled to or integrated with a second portion 1267 that extends from the second end 1252 towards the first end 1251. In some embodiments, the first portion 1265 can comprise a concave inner surface, and the second portion 1267 can comprise a concave inner surface, and the outer surfaces of the first and second portions 1265, 1267 can be convex or curved. In some embodiments, the insert 1250 can comprise a band support extension 1270 extending from the body 1260. The use of the insert 1250 is shown in FIGS. 13A-13C. For example, FIG. 13A shows a cap 1300 with a bill 1310 positioned on a platen 300 in accordance with some embodiments of the invention. Further, FIG. 13B shows a close-up view of a cap 1300 with a bill 1310 and coupled band 1315 positioned on a platen 300 in accordance with some embodiments of the invention. Further, FIG. 13C shows a close-up of a cap 1300 positioned on a platen 300 with band 1315 forward in accordance with some embodiments of the invention.

In some alternative embodiments, any of the pads disclosed herein can comprise one or more shaped or conformable gel pads. In some embodiments, some dimensions of the gel pads can be prepared as described above for the conformable pads. In some embodiments, a gel pad can be used in place of a conformable pad on the lower platen as described above and shown in the process 1100 of FIG. 11. In some embodiments, a second gel pad can be placed over the upper surface of the hat over one or more decorations and between the upper platen and the hat. In this instance, the second pad can comprise a specific shape to prevent the introduction of any artifacts from any portions of the upper platen.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and figures, and claims attached hereto. Various features and advantages of the invention are set forth in the following claims.

The invention claimed is:

1. A cap or hat decoration method *using a heat press,* comprising:

providing a press including a lower platen with two opposing side edges, a front edge, and a rear edge opposing the front edge, and *an* upper platen;

coupling a pad, having a portion with at least one convex outer surface of a conformable flexible or compressible polymer, with an internal wall formed on, and disposed in a substantially perpendicular configuration to, an inner surface of the pad opposing the at least one convex outer surface, and [being dimensioned based on one or more dimensions of the cap or hat,] *coupling the pad* to the lower platen with the internal wall placed against and below the front edge of the lower platen and the portion with the at least one convex outer surface of the conformable flexible or compressible polymer extending beyond and below the front edge of the lower platen;

positioning the cap or hat onto at least a portion of the pad;

positioning at least one decoration onto at least a portion of the cap or hat, the at least one decoration including a heat-activated adhesive; and heating and compressing the decoration onto the cap or hat by compressing the cap or hat and decoration between the lower platen and *the* upper platen.

2. The method of claim 1, wherein the pad entirely comprises a flexible or compressible polymer.

3. The method of claim 1, wherein the pad comprises a silicone polymer.

4. The method of claim 1, wherein the cap or hat comprises at least one concave inner surface.

5. The method of claim 1, wherein the compressing of the decoration onto the cap or hat comprises a compression time of between about 10 seconds and 45 seconds.

6. The method of claim 1, wherein at least one of the lower platen and upper platen are heated to a temperature that enables the decoration to reach a temperature of between 230° F. and 360° F.

7. The method of claim 1, wherein at least one of the lower platen and upper platen are heated to a temperature that enables the decoration to reach a temperature of between 380° F. and 430° F.

8. The method of claim 1, wherein the compressing of the decoration onto the cap or hat uses a compression force of between 20 lbs. to 80 lbs.

9. The method of claim 1, wherein the pad includes an inner edge positioned between a first and second portion of the pad.

10. The method of claim 1, wherein the pad includes an extension extending from one end of the pad, the extension configured [and arranged] to position a sweat band of the cap or hat.

11. The method of claim 1, wherein the lower platen is convex, and the upper platen is concave.

12. The method of claim 1, wherein the at least one decoration comprises at least one of a label, decal, insignia, mark, and marker.

13. A good processing method *using a heat press,* comprising:

[determining one or more dimensions of a good;

preparing a mold model using the one or more good dimensions;

preparing a mold based on the mold model;

preparing] *providing* at least a first pad [using the mold, the first pad] having a portion with at least one convex outer surface of a conformable flexible or compressible polymer, with an internal wall formed on, and disposed in a substantially perpendicular configuration to, an inner surface of the first pad opposing the at least one convex outer surface[, and being dimensioned based on one or more dimensions of the good transferred by the mold];

providing a press including a lower platen with two opposing side edges, a front edge, and a rear edge opposing the front edge, and *an* upper platen;

positioning the at least the first pad over the lower platen with the internal wall placed against and below the front edge of the lower platen and the portion with the at least one convex outer surface of the conformable flexible or compressible polymer extending beyond and below the front edge of the lower platen;

positioning the good onto at least a portion of the first pad;

positioning at least one decoration onto at least a portion of the good, the at least one decoration including a heat-activated adhesive; and heating and compressing the decoration onto the good by compressing the good and decoration between the lower platen and *the* upper platen, wherein at least one of the lower or *the* upper platen is heated.

14. The method of claim 13, wherein the lower platen is convex, and the upper platen is concave, and the pad comprises at least one concave inner surface.

15. The method of claim 13, wherein the pad [entirely] comprises a flexible or compressible polymer.

16. The method of claim 13, wherein the pad includes an inner edge positioned between a first and second portion of the pad, and further includes an extension extending from one end of the pad, the extension configured [and arranged] to position a sweat band of the good.

17. The method of claim 13, wherein at least one of the lower platen and upper platen are heated to a temperature of a range selected from ranges 230° F. to 360° F., and 380° F. to 430° F., and 340° F. to 365° F.

18. The method of claim 13, wherein the compressing of the decoration onto the good comprises a compression time of between about 10 seconds and 45 seconds.

*19. A heat press, comprising:*

*a lower platen with a first edge, a second edge opposing the first edge, a third edge, and a fourth edge opposing the third edge;*

*an upper platen; and*

*a pad having i) a portion with at least one convex outer surface of a conformable flexible or compressible polymer, ii) an inner surface opposing the at least one convex outer surface, and iii) an internal wall formed on and disposed in a substantially perpendicular configuration to the inner surface, the pad coupled to the lower platen with the internal wall placed against the first edge of the lower platen and with the portion of the pad extending beyond and below the first edge of the lower platen;*

*wherein the upper platen is configured to be lowered against the lower platen for heating or compressing a decoration onto a cap that is positioned on the pad.*

* * * * *